(12) United States Patent
Eleftheriou et al.

(10) Patent No.: US 7,982,997 B2
(45) Date of Patent: *Jul. 19, 2011

(54) METHOD FOR AN EQUALIZER COMPUTATION IN A MEDIA SYSTEM USING A DATA SET SEPARATOR SEQUENCE

(75) Inventors: Evangelos S. Eleftheriou, Zurich (CH); Robert A. Hutchins, Tucson, AZ (US); Sedat Oelcer, Kilchberg (CH)

(73) Assignee: International Business Machines Corporation, Armonk, NY (US)

( * ) Notice: Subject to any disclaimer, the term of this patent is extended or adjusted under 35 U.S.C. 154(b) by 309 days.

This patent is subject to a terminal disclaimer.

(21) Appl. No.: 12/251,373

(22) Filed: Oct. 14, 2008

(65) Prior Publication Data

US 2009/0103202 A1 Apr. 23, 2009

Related U.S. Application Data

(63) Continuation of application No. 11/136,872, filed on May 25, 2005, now Pat. No. 7,457,355.

(51) Int. Cl.
G11B 5/035 (2006.01)
(52) U.S. Cl. .......................... 360/65; 375/232
(58) Field of Classification Search .................. None
See application file for complete search history.

(56) References Cited

U.S. PATENT DOCUMENTS

| | | | |
|---|---|---|---|
| 5,892,632 A | 4/1999 | Behrens et al. | |
| 5,949,820 A | 9/1999 | Shih et al. | |
| 6,031,672 A | 2/2000 | Bergquist et al. | |
| 6,154,017 A | 11/2000 | Contreras | |
| 6,424,686 B1 | 7/2002 | Hutchins et al. | |
| 6,546,063 B1 | 4/2003 | Lee et al. | |
| 6,614,841 B1 | 9/2003 | Ohta | |
| 6,771,699 B1 | 8/2004 | Karaoquz et al. | |
| 6,934,233 B2 | 8/2005 | Miyashita et al. | |
| 6,970,311 B2 | 11/2005 | Jaquette | |
| 7,102,839 B2 | 9/2006 | Berman et al. | |

(Continued)

FOREIGN PATENT DOCUMENTS

JP 10106162 4/1998

(Continued)

OTHER PUBLICATIONS

First Office Action dated Apr. 4, 2008 for U.S. Appl. No. 11/136,872, filed May 25, 2005 for inventor R.A. Hutchins.

(Continued)

*Primary Examiner* — Jason C Olson
(74) *Attorney, Agent, or Firm* — David W. Victor; Konrad Raynes & Victor LLP (57) ABSTRACT

Provided is a method for receiving a DSS sequence and a DSS readback sequence, which is a function of a channel processing of the DSS sequence by a read channel. A coefficient cyclic equalizer vector is generated as a function of the DSS sequence and the DSS readback sequence. An error signal is generated as a function of a comparison of the DSS sequence and an equalization of the DSS readback sequence based on the coefficient cyclic equalizer vector. An unacceptable error signal indicates a need to adjust the coefficient cyclic equalizer vector to yield an acceptable comparison of the DSS sequence and an equalization of the DSS readback sequence based on the coefficient cyclic equalizer vector.

4 Claims, 9 Drawing Sheets

U.S. PATENT DOCUMENTS

| | | |
|---|---|---|
| 7,116,736 B2 | 10/2006 | Blaum et al. |
| 7,119,974 B2 | 10/2006 | Jaquette |
| 7,256,954 B2 | 8/2007 | Serizawa |
| 7,271,971 B2 | 9/2007 | Hutchins et al. |
| 7,428,116 B2 | 9/2008 | Hutchins et al. |

FOREIGN PATENT DOCUMENTS

| | | |
|---|---|---|
| JP | 10208395 | 8/1998 |
| JP | 2005063444 | 3/2005 |

OTHER PUBLICATIONS

Amendment dated Apr. 24, 2008 to First Office Action dated Apr. 4, 2008 for U.S. Appl. No. 11/136,872, filed May 25, 2005 for inventor R.A. Hutchins.

Notice of Allowance dated Jul. 21, 2008 for U.S. Appl. No. 11/136,872, filed May 25, 2005 for inventor R.A. Hutchins.

"Information Materials for IDS"—art cited in JPO Office Action, IBM Corporation, Date of JP Office Action Mar. 8, 2011.

METHOD FOR AN EQUALIZER COMPUTATION IN A MEDIA SYSTEM USING A DATA SET SEPARATOR SEQUENCE

CROSS-REFERENCE TO RELATED APPLICATIONS

This application is a continuation of U.S. application Ser. No. 11/136,872, filed on May 25, 2005, which application is incorporated herein by reference in its entirety.

FIELD OF INVENTION

The present invention generally relates to equalizer computation in read channels of tape drive systems. The present invention specifically relates to an implementation of a cyclic equalization for computing an equalizer in a magnetic recording channel using embedded data set separator sequences in order to shape the overall channel response toward a given target characteristic.

BACKGROUND OF THE INVENTION

Figure 1:
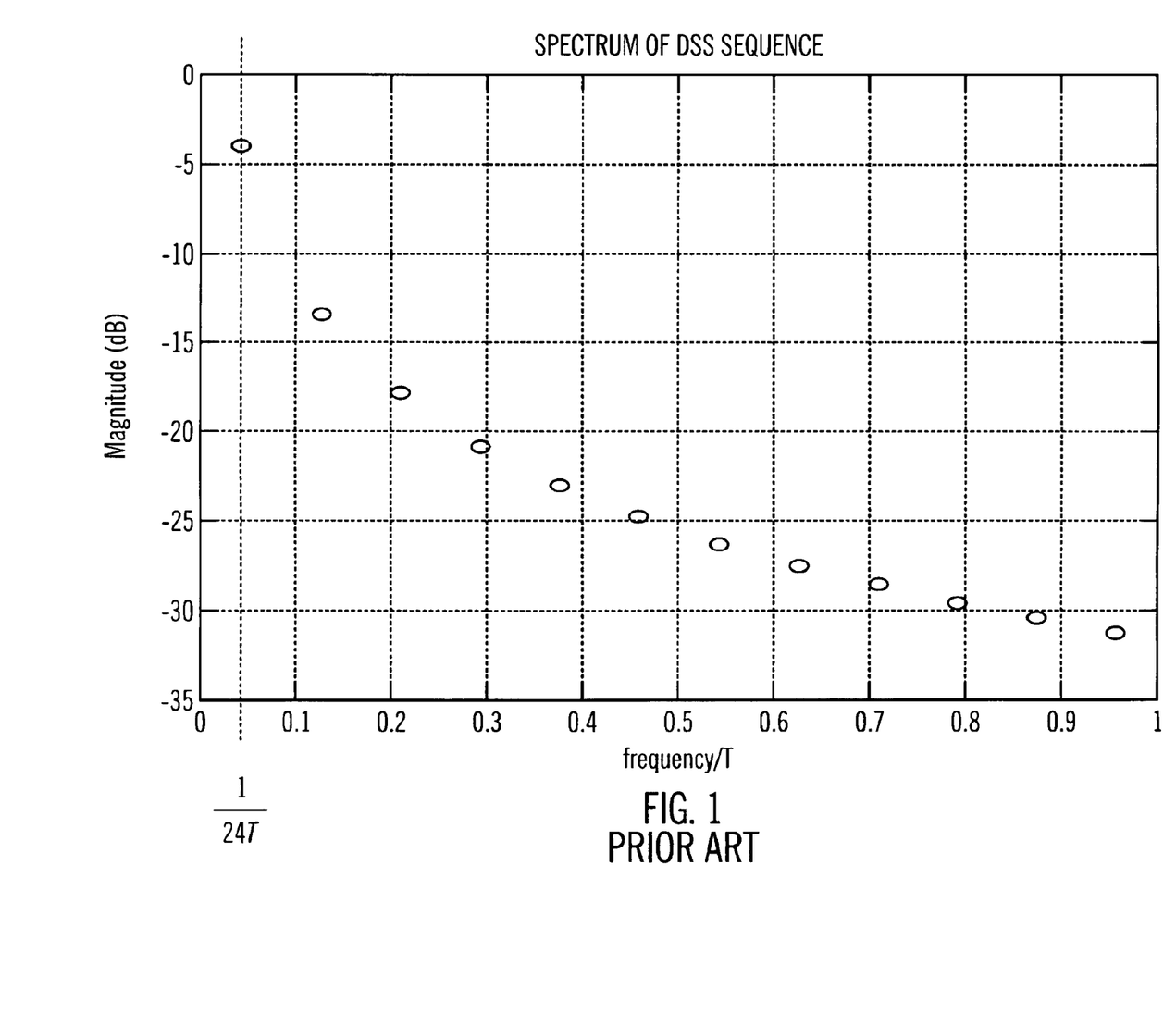
FIG. 1 illustrates a spectrum of a DSS sequence as is known in the art.

FIG. 1 illustrates a known spectrum of a DSS sequence, which consists in NRZI form of a repeated 24 bipolar-symbol pattern as follows:

$p_{24}$={+1+1+1+1+1+1+1+1+1+1+1+1−1−1−1−1−1−1−1−1−1−1−1−1}

This data set separator sequence can thus be regarded as a periodic square wave s(t) with a period 24 T, where T denotes the symbol duration. A Fourier transform of this square wave is given by the following equation (1):

$$S(f) = \sum_n S_n \delta\left(f - \frac{n}{24T}\right), \quad (1)$$

with $$S_n = \begin{cases} \operatorname{sinc}(n/2) & n \text{ odd} \\ 0 & n \text{ even} \end{cases}.$$

Hence, S(f) represents a line spectrum that is nonzero at odd frequencies and decreases in magnitude as 1/f.

The data set separator sequence illustrated in FIG. 1 has been used for an equalizer computation in read channels of tape-drive systems. However, such previous uses of the data set separator sequence for an equalizer computation has proven to be suitable for targets with low-order polynomials (e.g., (1−D2) PR4 polynomial) and has proven to be unsuitable for targets with high-order polynomials (e.g., (1+2D−2D3−D4) EEPR4) and general polynomials used in noise-predictive maximum-likelihood detection systems. In view of the fact that high-order polynomials and general polynomials used in noise-predictive maximum-likelihood detection systems are needed in high-performance/high-capacity tape systems, where the need exists to achieve a better match of the target characteristic to the physical channel characteristic, a challenge for the media storage industry is to improve upon the use of data set separator sequence for an equalizer computation in read channels of tape-drive systems.

SUMMARY OF THE INVENTION

One form of the present invention is signal bearing medium tangibly embodying a program of machine-readable instructions executable by a processor to perform operations for an equalizer computation in a read channel of a media system. The operations comprise a reception of an electrical communication of a DSS sequence and a DSS readback sequence, which is a function of a channel processing of the DSS sequence by the read channel. The operations further comprise a generation of a coefficient cyclic equalizer vector as a function of the DSS sequence and the DSS readback sequence.

A second form of the present invention is a media system comprising a processor and a memory storing instructions operable with the processor for an equalizer computation in a read channel of a media system. The instructions are executed for receiving an electrical communication of a DSS sequence and a DSS readback sequence, which is a function of a channel processing of the DSS sequence by the read channel. The instructions are further executed for generating a coefficient cyclic equalizer vector as a function of the DSS sequence and the DSS readback sequence.

A third form of the present invention is method for an equalizer computation in a read channel of a media system. The method comprises a reception of an electrical communication of a DSS sequence and a DSS readback sequence, which is a function of a channel processing of the DSS sequence by the read channel. The method further comprises a generation of a coefficient cyclic equalizer vector as a function of the DSS sequence and the DSS readback sequence.

A fourth form of the present invention is a media system comprising a read channel and an equalizer coefficient generator. The read channel generates a DSS readback sequence as a function of a channel processing of a DSS sequence. The equalizer coefficient generator generates a coefficient cyclic equalizer vector as a function of the DSS sequence and the DSS readback sequence.

A fifth form of the present invention is a media system comprising an equalizer coefficients generation unit, and a performance measuring unit. The equalizer coefficients generation unit generates a coefficient cyclic equalizer vector as a function of the DSS sequence and the DSS readback sequence, which is a function of a channel processing of the DSS sequence. The performance measurement unit generates an error signal as a function of a comparison of the DSS sequence and an equalization of the DSS readback sequence based on the coefficient cyclic equalizer vector.

The forgoing forms and other forms, objects, and aspects as well as features and advantages of the present invention will become further apparent from the following detailed description of the various embodiments of the present invention, read in conjunction with the accompanying drawings. The detailed description and drawings are merely illustrative of the present invention, rather than limiting the scope of the present invention being defined by the appended claims and equivalents thereof.

DETAILED DESCRIPTION OF THE PRESENT INVENTION

Figure 2:
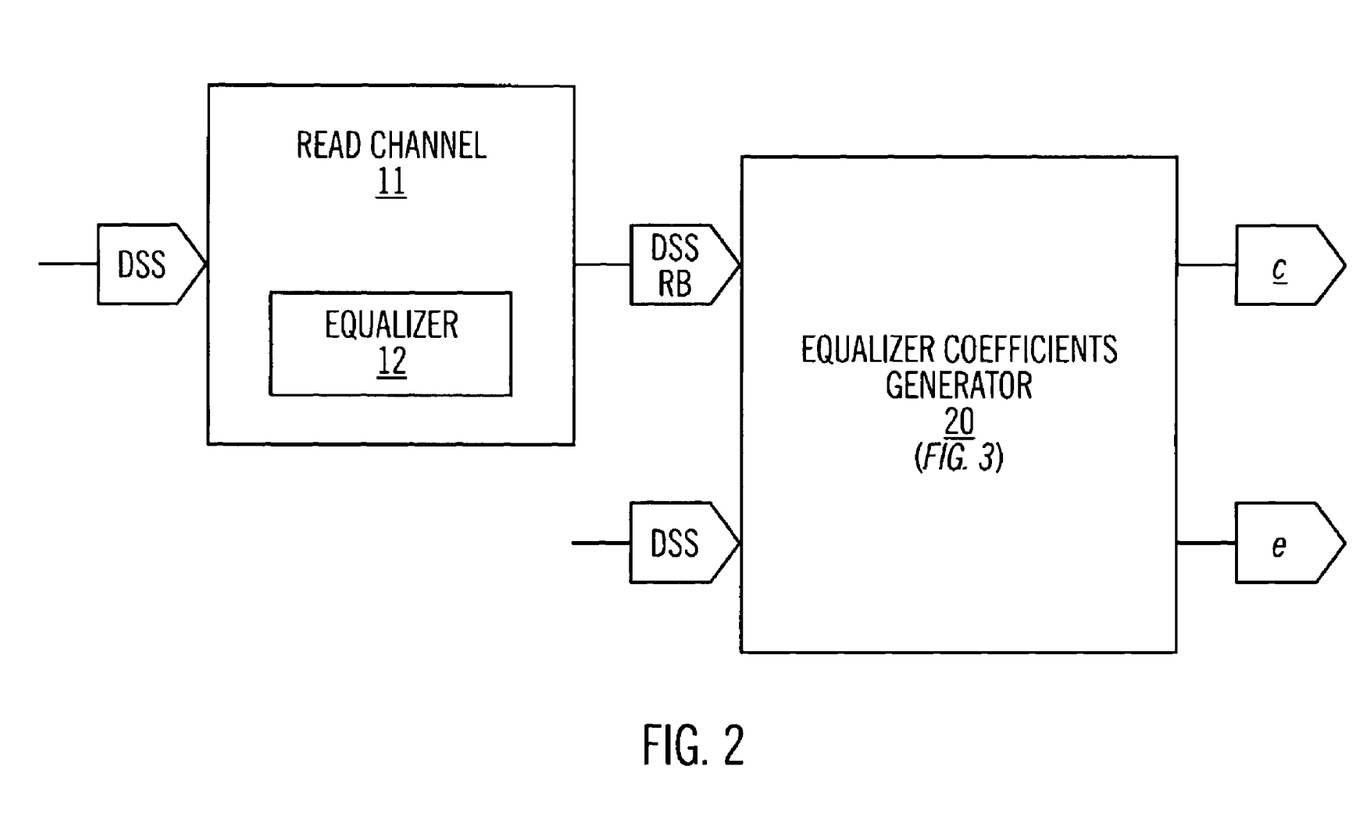
FIG. 2 illustrates an equalizer coefficients generator in accordance with the present invention.

FIG. 2 illustrates an equalizer coefficients generator 20 of the present invention. Generator 20 is structurally configured with hardware, software and/or firmware to receive an electrical communication of a DSS sequence ("DSS") and a DSS readback sequence ("DSS RB), which is generated by a conventional channel processing of the DSS sequence by a read channel 11 employing an equalizer 12. Generator 20 is further structurally configured with hardware, software and/or firmware to generate a coefficient cyclic equalizer veector c as a function of the DSS sequence and the DSS readback sequence. In one exemplary embodiment, generator 20 executes a N-point sampling of the DSS sequence as filtered by a target filter having a known target response, executes a N-point sampling of the DSS readback sequence as generated by a conventional channel processing of the DSS sequence by a read channel 11 having an unknown channel response, and executes a computation of N-coefficient cyclic equalizer veector c as a function of the N-point filter sampling of the DSS sequence and the N-point sampling of the DSS readback sequence.

Generator 20 is also structurally configured with hardware, software and/or firmware to generate an error signal e as a function of a comparison of the DSS sequence and an equalization of the DSS readback sequence based on coefficient cyclic equalizer veector c. In one exemplary embodiment, generator 20, generates error signal e as a differential between an N-point filtered sampling of the DSS sequence and an equalization of an N-point sampling of the DSS readback sequence based on the N-coefficient cyclic equalizer veector c.

In operation, the unknown channel response of read channel 11 is normally not ideal whereby coefficient cyclic equalizer veector c is used to reconfigure equalizer 12 in view of facilitating an acceptable response from read channel 11. Accordingly, generator 20 or an external source (not shown) adjusts the generation of coefficient cyclic equalizer veector c by generator 20 as needed to achieve an acceptable differential indication by error signal e for purposes of reconfiguring equalizer 12 with a view of facilitating an acceptable channel response of read channel 11.

In practice, the present invention does not impose any limitations or any restrictions as to the structural configuration of generator 20. Thus, the following description of an exemplary embodiment 21 of generator 20 does not limit the scope of the structural configuration of generator 20.

Figure 3:
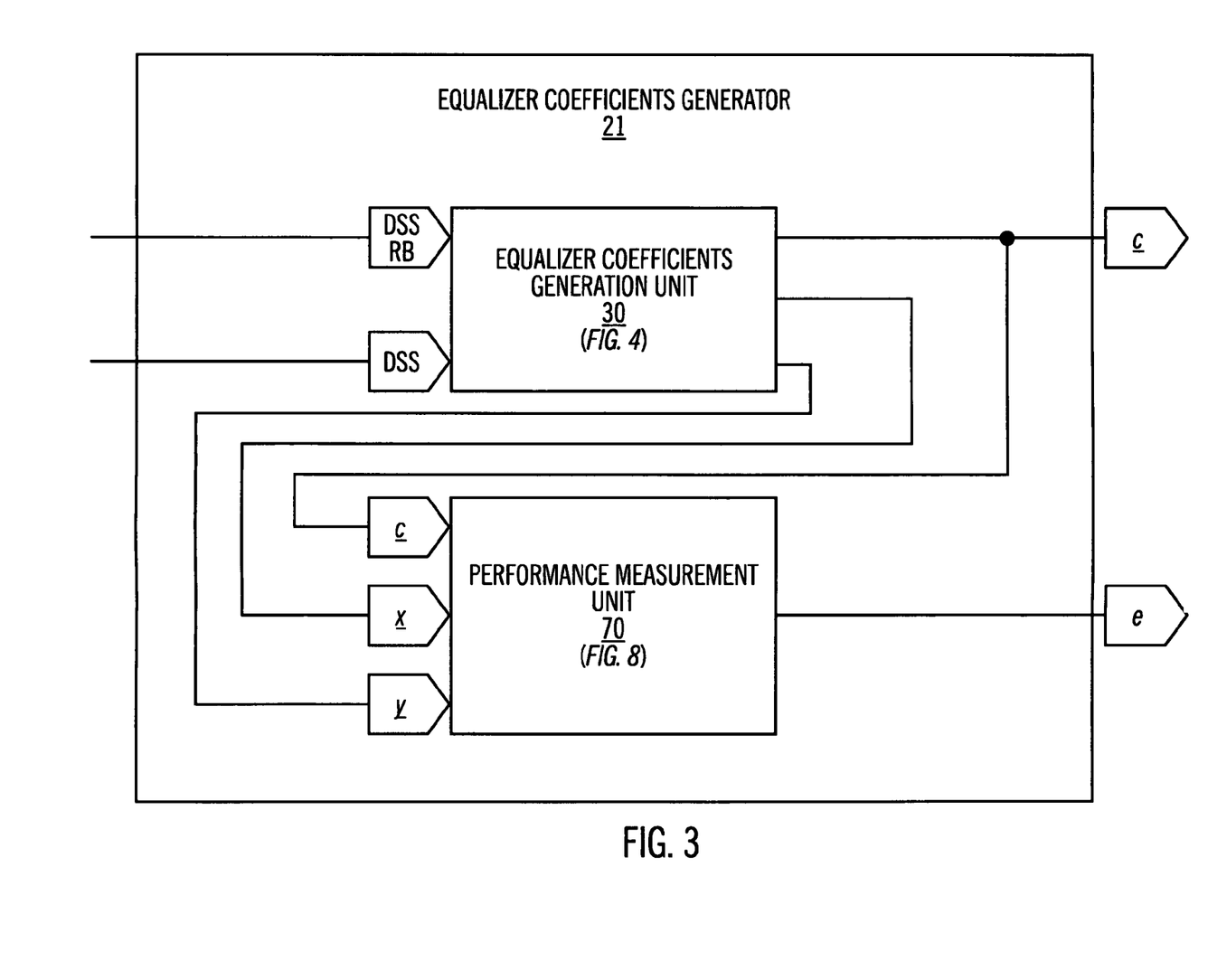
FIG. 3 illustrates one embodiment of the equalizer coefficients generator illustrated in FIG. 2.

FIG. 3 illustrates exemplary embodiment 21 of generator 20 (FIG. 2) employing an equalizer coefficients generation unit 30 and a performance measurement unit 70. Unit 30 is structurally configured with hardware, software and/or firmware to receive an electrical communication of the DSS sequence and the DSS readback sequence. Unit 30 is further structurally configured with hardware, software and/or firmware to generate a DSS readback vector y as a function of a sampling of the DSS readback sequence, to generate a DSS reference vector x as a function of a filtered sampling of the DSS sequence, and to generate coefficient cyclic equalizer veector c as a function of DSS readback vector y and DSS reference vector x.

In one exemplary embodiment, unit 30 generates DSS readback vector y to include N-point samples of the DSS readback sequence as generated by a conventional processing of the DSS sequence by read channel 11 (FIG. 2) having an unknown channel response, generates DSS reference vector x to include N-point samples of the DSS sequence as filtered by a target filter having a known target response, and generates coefficient cyclic equalizer veector c to include N-equalizer coefficients computed from DSS readback vector y and DSS reference vector x.

Unit 70 is structurally configured with hardware, software and/or firmware to generate error signal e as a function of a comparison of an equalized DSS readback vector y' and DSS reference vector x. In one exemplary embodiment, unit 70 generates error signal e as a differential between DSS reference vector x including an N-point filtered samples of the DSS sequence, and equalized DSS readback sequence y' including an equalization of N-point samples of the DSS sequence based on coefficient cyclic equalizer veector c including N-equalizer coefficients.

In practice, the present invention does not impose any limitations or any restrictions as to the structural configuration of units 30 and 70. Thus, the following description of an exemplary embodiments 31 and 71 of respective units 30 and 70 does not limit the scope of the structural configuration of units 30 and 70.

Figure 4:
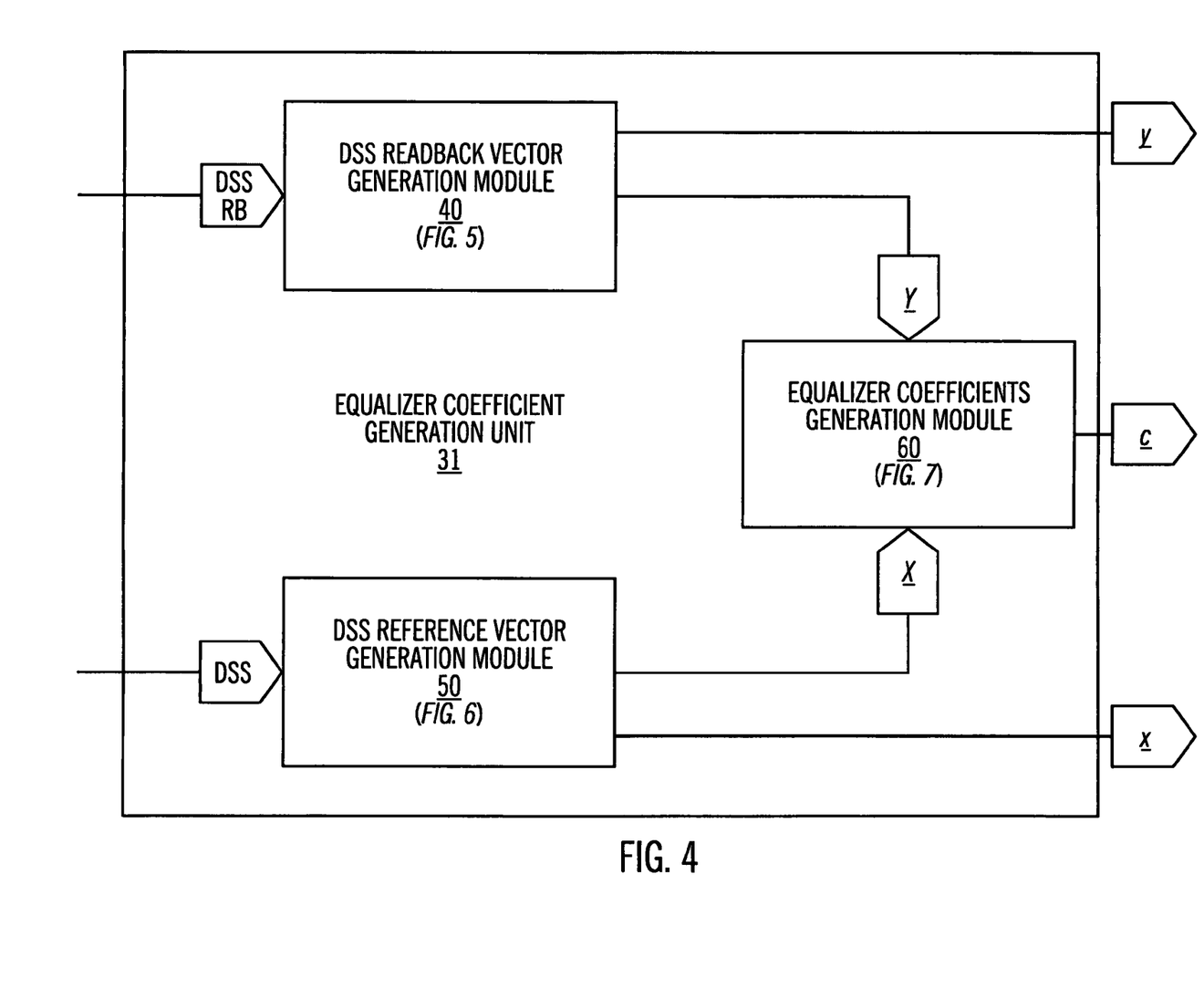
FIG. 4 illustrates one embodiment of an equalizer coefficients generation unit in accordance with the present invention

FIG. 4 illustrates exemplary embodiment 31 of unit 30 (FIG. 3) employing a DSS readback vector generation module 40, a DSS reference vector generation module 50, and an equalizer coefficient generation module 60.

Module 40 is structurally configured with hardware, software and/or firmware to receive an electrical communication of the DSS readback sequence and to generate DSS readback vector y and a DSS readback complex vector Y as a function of a sampling of the DSS readback sequence. In one exemplary embodiment, module 40 generates DSS readback vector y to include N-point samples of the DSS readback sequence, and generates DSS readback complex vector Y to include a discrete Fourier transformation of an average of DSS readback vector y.

Module 50 is structurally configured with hardware, software and/or firmware to receive an electrical communication of the DSS sequence, and to generate a DSS reference vector x and a DSS reference complex vector X as a function of a filtered sampling of the DSS sequence. In one exemplary embodiment, module 50 generates DSS reference vector x to include N-point filtered samples of the DSS sequence as filtered through a target filter having a known target response, and generates DSS reference complex vector X to include a discrete Fourier transformation of an average of DSS reference vector x.

Module 60 is structurally configured with hardware, software and/or firmware to receive an electrical communication of DSS readback complex vector Y and DSS reference complex vector X, and to generate coefficient cyclic equalizer veector c as a function of DSS readback complex vector Y and DSS reference complex vector X. In one exemplary embodiment, module 60 generates odd indices of a coefficient cyclic equalizer complex vector C as a function of a diagonal matrix based on DSS readback complex vector Y and DSS reference complex vector X, generates even indices of a coefficient cyclic equalizer complex vector C as a function of an interpolation of the odd indices of coefficient cyclic equalizer complex vector $\tilde{C}$ and generates coefficient cyclic equalizer veector c as a function of an inverse Fourier transformation of the computed odd indices and interpolated even indices of coefficient cyclic equalizer complex vector C.

In operation, N-equalizer coefficients of coefficient cyclic equalizer veector c are cyclically rotated for a best alignment before being used for random data by a positioning of the largest equalizer coefficient at a center of a tapped delay line. In embodiments of an equalizer 12 (FIG. 2) having less than N-equalizer coefficients, the obtained equalizer impulse response can be truncated or approximated as would be appreciated by those having ordinary skill in the art.

In practice, the present invention does not impose any limitations or any restrictions as to the structural configurations of modules 40, 50 and 60. Thus, the following description of exemplary embodiments 41, 51 and 61 of modules 40, 50 and 60 as illustrated respectively in FIGS. 5-7 does not limit the scope of the structural configurations of modules 40, 50 and 60.

Figure 5:
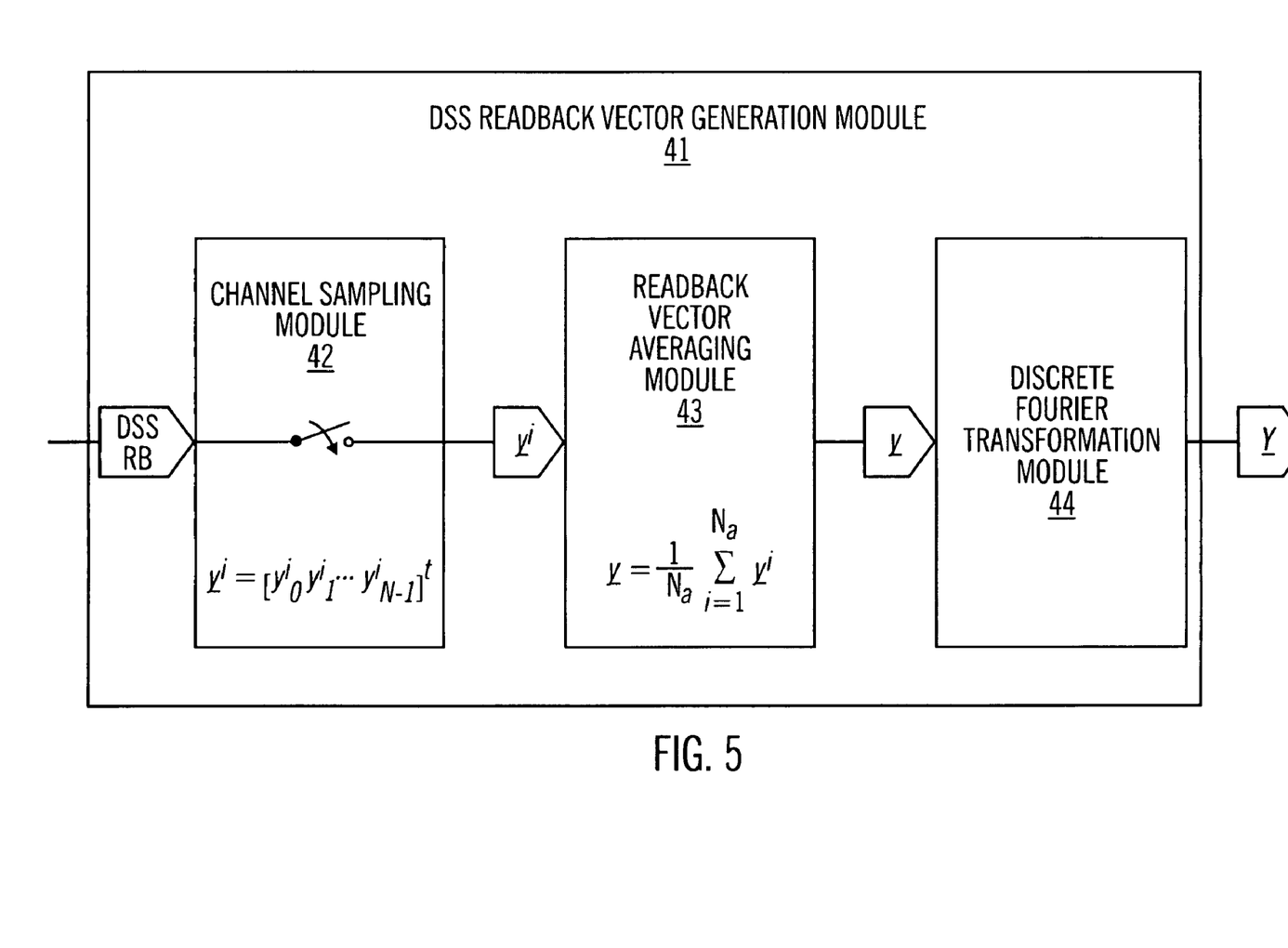
FIG. 5 illustrates one embodiment of a DSS readback complex vector generation module in accordance with the present invention.

FIG. 5 illustrates an embodiment 41 of module 40 (FIG. 3) employing a channel sampling module 42, a readback vector averaging module 43, and a discrete Fourier transformation module 44.

Module 42 is structurally configured with hardware, software and/or firmware to execute a N-point sampling of the DSS readback sequence at a sample rate of $1/T_S=5/(4\,T)$ to yield a channel sampled readback vector $\underline{y}^i[y^i_0 y^i_1 \ldots y^i_{N-1}]^t$ of N consecutive $T_S=(4/5)T$ spaced samples of an actual readback DSS waveform. In general, the number of samples N is equal to the number of coefficients of equalizer 12 (FIG. 2) and $NT_S$ is equal to one period of the DSS sequence, that is, $NT_S=24\,T$.

Module 43 is structurally configured with hardware, software and/or firmware to average DSS readback vector $\underline{y}$ over a set of readback vectors $\underline{y}^i$, $i=1, 2, \ldots, N_{av}$, in accordance with $$\underline{y} = \frac{1}{N_a}\sum_{i=1}^{N_a} \underline{y}^i.$$

Module 44 is structurally configured with hardware, software and/or firmware to perform a discrete Fourier transformation of DSS readback vector $\underline{y}$ to yield readback complex vector Y.

Figure 6:
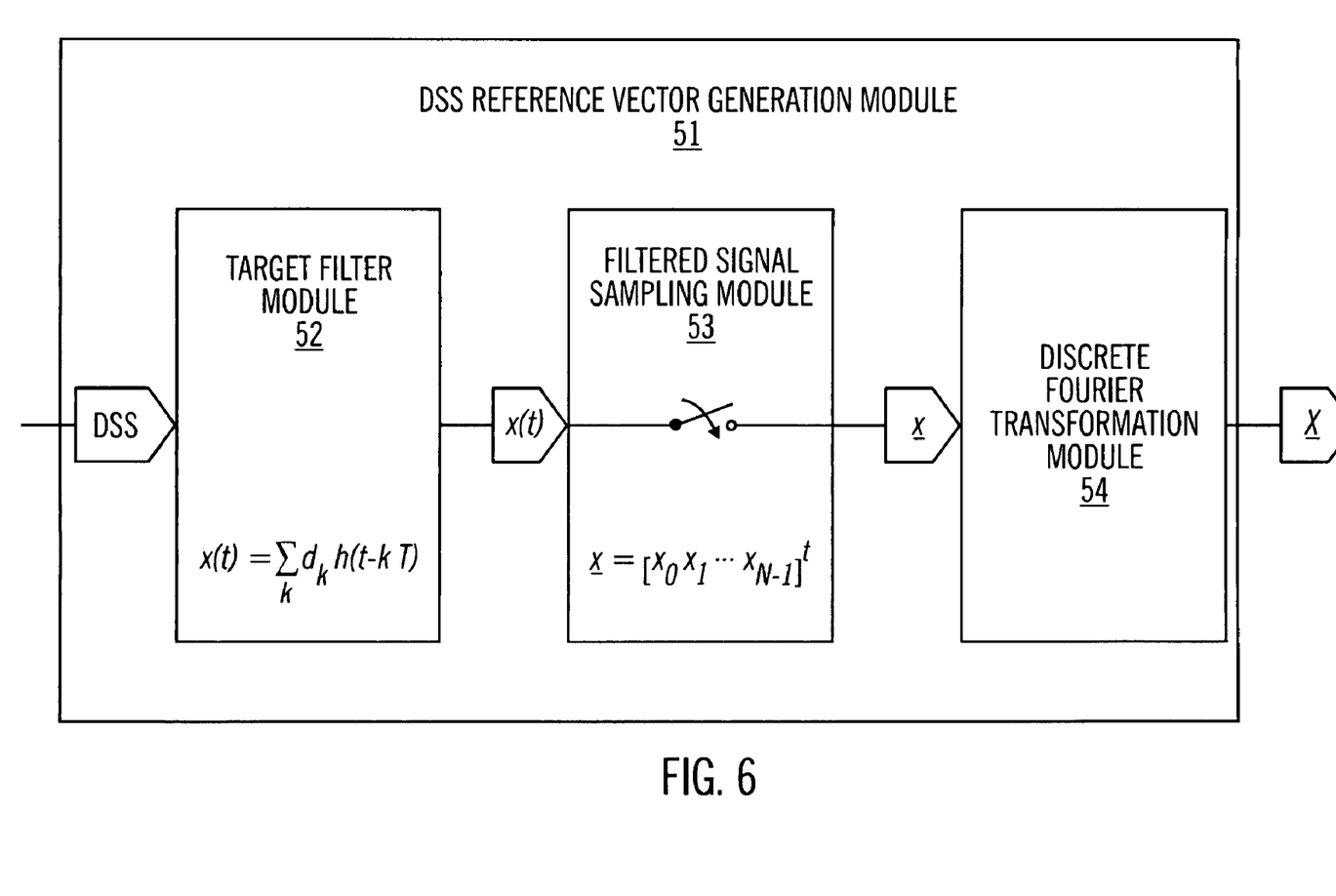
FIG. 6 illustrates one embodiment of a DSS reference complex vector generation module in accordance with the present invention.

FIG. 6 illustrates exemplary embodiment 51 of module 50 (FIG. 3) employing a target filter module 52, filter sampling module 53, and a discrete Fourier transformation module 54.

Module 52 is structurally configured with hardware, software and/or firmware to generate a filter signal x(t) representative of a filtering of the DSS sequence with a known target response in accordance with, where $d_k$ is the DSS sequence and the filter response h(t) is the pulse or dibit response representing the equalization target.

Module 53 is structurally configured with hardware, software and/or firmware to perform a N-point sampling of filter signal x(t) at a sample rate of $5/(4\,T)$ to yield DSS reference vector $\underline{x}=[x_0\,x_1\,\ldots\,x_{N-1}]^t$ including N consecutive $(4/5)T$ spaced samples of a filtered DSS sequence. Again, in general, the number of samples N is equal to the number of coefficients of equalizer 12 (FIG. 2) and $NT_S$ is equal to one period of the DSS sequence, that is, $NT_S=24\,T$.

Module 54 is structurally configured with hardware, software and/or firmware to perform a discrete Fourier transformation of the DSS reference vector $\underline{x}$ to yield DSS reference complex vector X.

Figure 7:
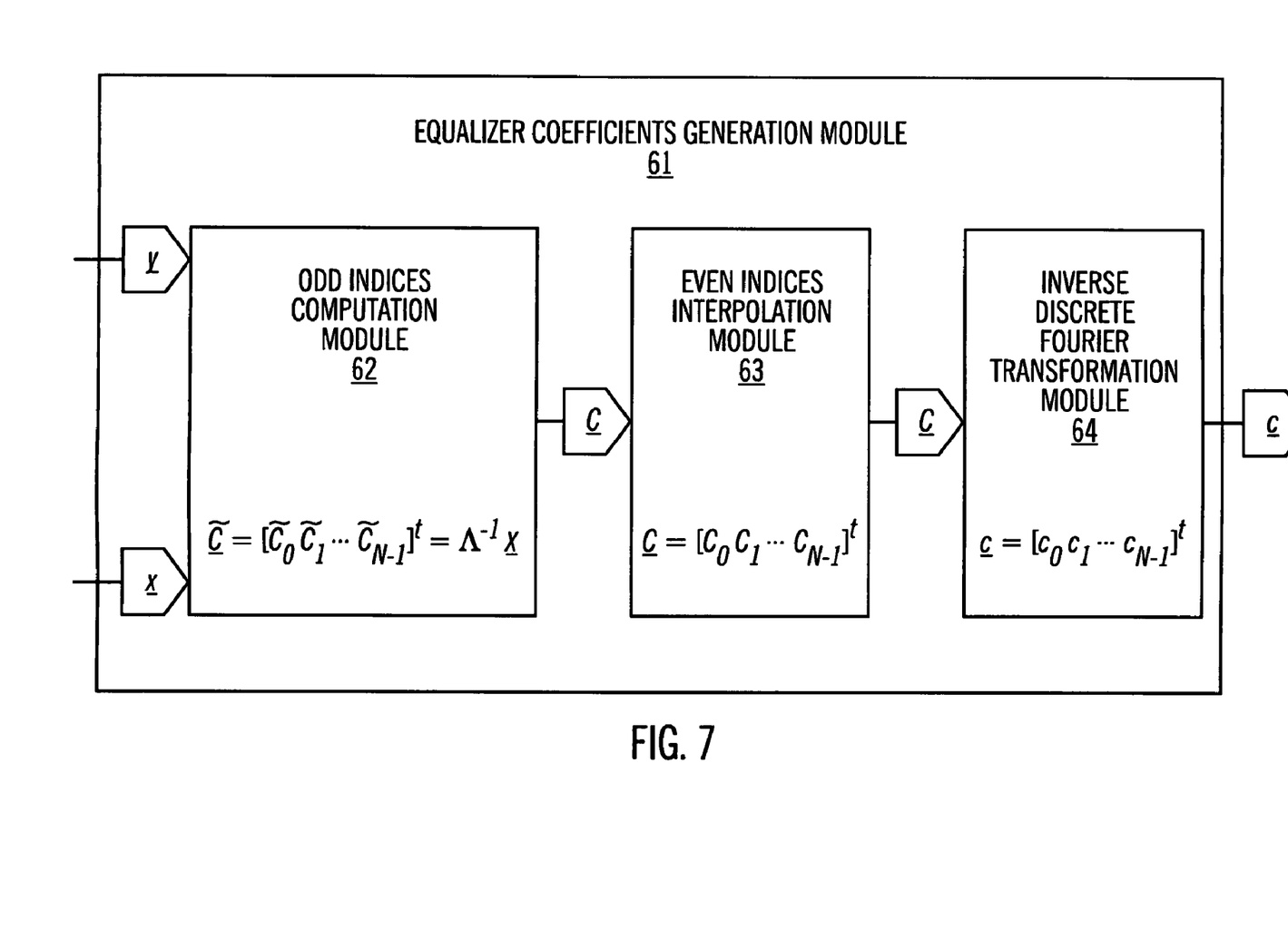
FIG. 7 illustrates one embodiment of an equalizer coefficients generation module in accordance with the present invention.

FIG. 7 illustrates exemplary embodiment 61 of module 60 (FIG. 2) employing an odd indices computation module 62, an even indices interpolator module 63 and an inverse discrete Fourier transformation module 64.

Module 62 is structurally configured with hardware, software and/or firmware to generate a N-coefficient cyclic equalizer vector $\tilde{C}$ as a function of a N×N diagonal matrix based on DSS readback complex vector Y and DSS reference complex vector X in accordance with $\underline{\tilde{C}}=[\tilde{C}_0\,\tilde{C}_1\,\ldots\,\tilde{C}_{N-1}]^t=\Lambda^{-1}X$.

Module 63 is structurally configured with hardware, software and/or firmware to linearly interpolate, in magnitude and phase, N-coefficient cyclic equalizer vector $\underline{\tilde{C}}$ to obtain spectral values $\underline{C}=[C_0\,C_1\,\ldots\,C_{N-1}]^t$ in accordance with $$|C_i| = \frac{|\tilde{C}_{i-1}|+|\tilde{C}_{i+1}|}{2} \text{ and } \phi(C_i) = \frac{\phi(\tilde{C}_{i-1})+\phi(\tilde{C}_{i+1})}{2}$$

where φ(A) denotes the phase of the complex number A, and i=2, 4, ..., N/2 for N even, i=2, 4, ..., (N−3)/2 for N odd, and $C_i=\tilde{C}_i$ for i odd. In this embodiment, the spectral component with index i=0 is undetermined. Accordingly, this component is set to a small value without affecting the solution, because the magnetic recording channel does not transmit dc.

Module 64 is structurally configured with hardware, software and/or firmware to perform an inverse discrete Fourier transformation of the spectral values N-coefficient cyclic equalizer vector C to yield coefficient cyclic equalizer veector c including N-equalizer coefficients in accordance with $\underline{c}=[c_0\,c_1\,\ldots\,c_{N-1}]^t$.

Figure 8:
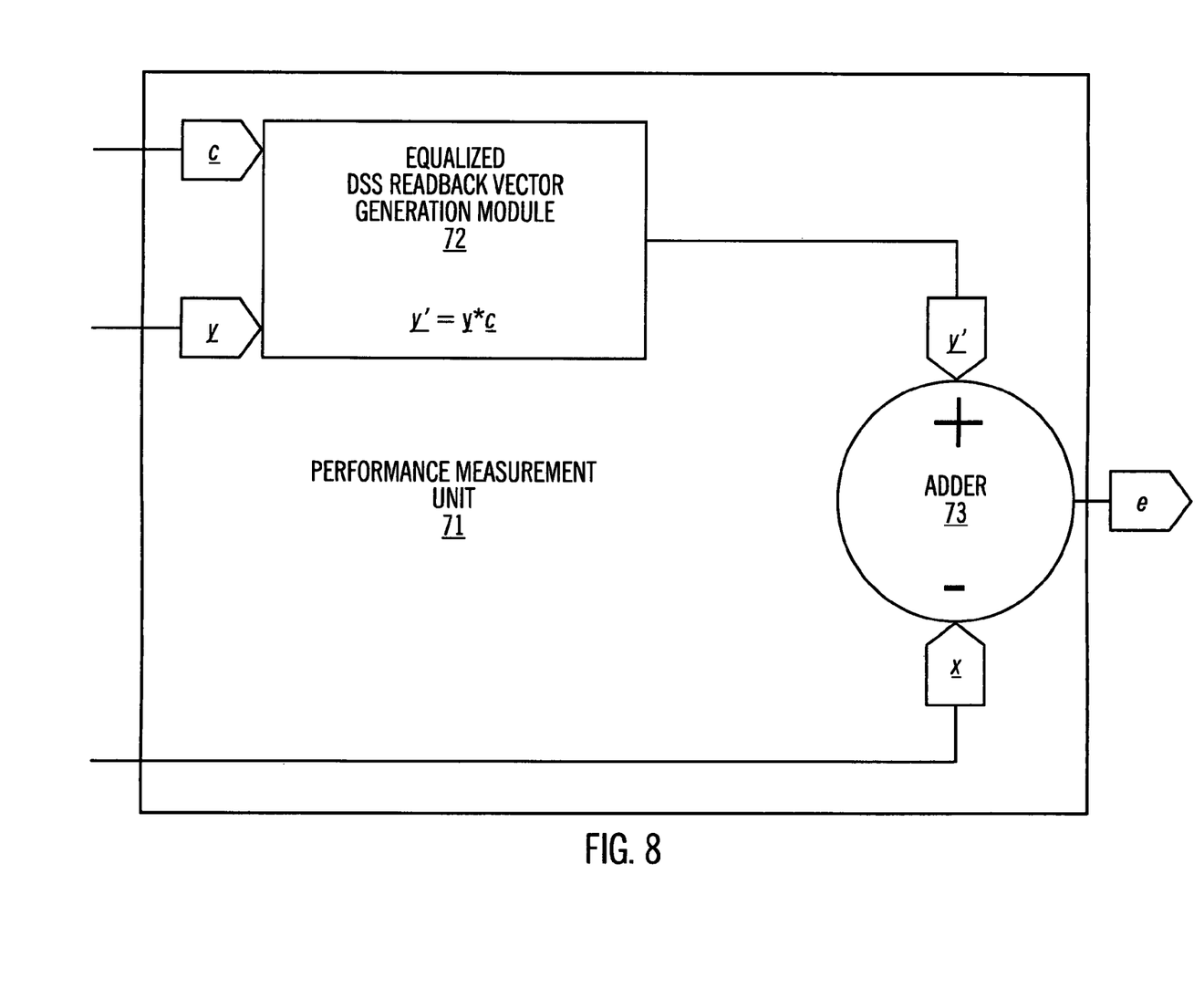
FIG. 8 illustrates one embodiment of a performance measurement unit in accordance with the present invention.

FIG. 8 illustrates an exemplary embodiment 71 of performance measurement unit 70 (FIG. 2) of the present invention employing a equalized DSS readback vector generation module 72 and an adder 73.

Module 72 is structurally configured with hardware, software and/or firmware to receive an electrical communication of DSS readback vector $\underline{y}$ and coefficient cyclic equalizer veector c, and to generate an equalized DSS readback vector $\underline{y}'$ as a function of an equalization of DSS readback vector $\underline{y}$ based on coefficient cyclic equalizer vector c in accordance $\underline{y}'=\underline{y}*\underline{c}$.

Adder 73 is structurally configured with hardware, software and/or firmware to receive an electrical communication of an equalized DSS readback vector $\underline{y}'$ and DSS reference vector $\underline{x}$, and to generate an error signal e as a differential between equalized DSS readback vector $\underline{y}'$ and DSS reference vector x. Those having ordinary skill in the art will appreciate a representation by error signal e of zero (0) difference between reference equalized DSS readback vector $\underline{y}'$ and DSS reference vector x indicates an accurate computation of the N-equalizer coefficients of coefficient cyclic equalizer veector c. Conversely, those having ordinary skill in the art will appreciate a representation by error signal e of a non-zero difference between equalized DSS readback vector $\underline{y}'$ and DSS reference vector x indicates an inaccurate computation of N-equalizer coefficients of coefficient cyclic equalizer veector c. In this case, various parameters of module 10 can be reconfigured until such time error signal e represents an acceptably small difference between equalized DSS readback vector y' and DSS reference vector x. In operation, a phase shift parameter τ can be included in the argument of the target response, yielding the signal $$x(t) = \sum_k d_k h(t + \tau - kT),$$

and the error signal e is minimized over a variation range of the parameter τ.

In practice, the present invention does not impose any limitations or any restrictions as to the structural configurations of module 72 and adder 73. Thus, the preceding description of exemplary embodiments of module 72 and adder 73 does not limit the scope of the structural configurations of module 72 and adder 73.

Referring to FIG. 8, an alternative embodiment of unit 71 can employ versions of modules 42 and 43 as previously described herein in connection with FIG. 4 to generate and provide DSS readback vector y to module 72. The alternative embodiment can further employ versions of filter 52 and module 53 as previously described herein in connection with FIG. 4 to generate and provide DSS reference vector x to adder 73.

Figure 9:
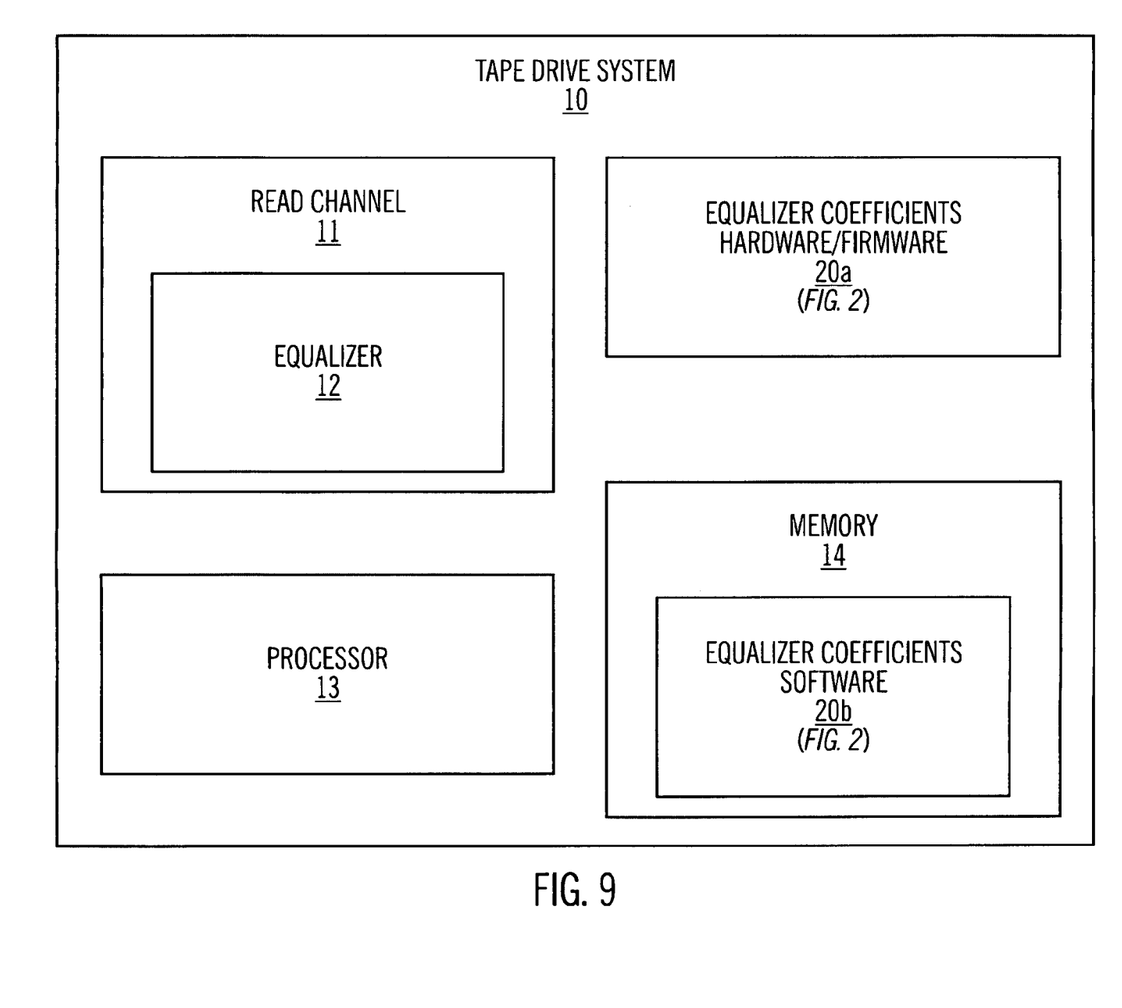
FIG. 9 illustrates one embodiment of a tape drive system in accordance with the present invention.

FIG. 10 illustrates a tape drive system 10 employing read channel 11, equalizer 12, a processor 13 and a memory 14. FIG. 9 does not illustrate any particular interface architecture of channel 11, equalizer 12, processor 13 and memory 14, because in practice, the present invention does not impose any limitations or any restrictions as to the interfacing of components 11-14 and any other components of system 10 as would occur to those having ordinary skill in the art. In practice, as would be appreciated by those having ordinary skill in the art, each component of generator 20 (FIG. 2) can be incorporated in the interface architecture as hardware/firmware 20a, or as soft ware 20b written in any conventional language and installed within a memory 14 whereby processor 13 can execute software 20b.

While the embodiments of the present invention disclosed herein are presently considered to be preferred embodiments, various changes and modifications can be made without departing from the spirit and scope of the present invention. The scope of the invention is indicated in the appended claims, and all changes that come within the meaning and range of equivalents are intended to be embraced therein.

We claim:

1. A method for an equalizer computation in a read channel of a media system, comprising:
   receiving an electrical communication of a data set separator sequence and a data set separator readback sequence, wherein the data set separator readback sequence is a function of a channel processing of the data set separator sequence by the read channel; and
   generating a coefficient cyclic equalizer vector as a function of the data set separator sequence and the data set separator readback sequence wherein the generating of the coefficient cyclic equalizer vector as a function of the data set separator sequence and the data set separator readback sequence includes:
      generating a data set separator readback vector as a function of a sampling of the data set separator readback sequence;
      generating a data set separator reference vector as a function of a filtered sampling of the data set separator sequence: and
      generating the coefficient cyclic equalizer vector as a function of the data set separator readback vector and the data set separator reference vector and wherein the generating of the coefficient cyclic equalizer vector as a function of the data set separator readback vector and the data set separator reference vector further includes:
         generating odd indices of the coefficient cyclic equalizer vector as a function of a diagonal matrix based on the data set separator readback vector and the data set separator reference vector; and
         generating even indices of the coefficient cyclic equalizer vector as a function of an interpolation of the odd indices of the coefficient cyclic equalizer vector.

2. The method of claim 1, further comprising:
   generating an error signal as a function of a comparison of the data set separator sequence and an equalization of the data set separator readback sequence based on the coefficient cyclic equalizer vector.

3. A method for an equalizer computation in a read channel of a media system, the operations comprising:
   receiving an electrical communication of a data set separator sequence and a data set separator readback sequence, wherein the data set separator readback sequence is a function of a channel processing of the data set separator sequence by the read channel; and
   generating a coefficient cyclic equalizer vector as a function of the data set separator sequence and the data set separator readback sequence, wherein the generating of the coefficient cyclic equalizer vector as a function of the data set separator sequence and the data set separator readback sequence includes:
      generating a data set separator readback complex vector as a function of a discrete Fourier transformation of an average of a sampling of the data set separator readback sequence;
      generating a data set separator reference complex vector as a function of a discrete Fourier transformation of a filtered sampling of the data set separator sequence;
      and generating a coefficient cyclic equalizer complex vector as a function of the data set separator readback complex vector and the data set separator reference complex vector.

4. The method of claim 3, wherein the generating of the coefficient cyclic equalizer vector as a function of the data set separator sequence and the data set separator readback sequence further includes:
   generating odd indices of the coefficient cyclic equalizer complex vector as a function of a diagonal matrix based on the data set separator readback complex vector and the data set separator reference complex vector;
   generating even indices of the coefficient cyclic equalizer complex vector as a function of an interpolation of the odd indices of the coefficient cyclic equalizer complex vector; and
   generating the coefficient cyclic equalizer vector as a function of an inverse discrete Fourier transformation of the coefficient cyclic equalizer complex vector.

* * * * *